(12) United States Patent
Takahashi et al.

(10) Patent No.: US 9,599,374 B2
(45) Date of Patent: Mar. 21, 2017

(54) MAGNETIC AIR CONDITIONER

(71) Applicant: NISSAN MOTOR CO., LTD., Kanagawa (JP)

(72) Inventors: Hidekazu Takahashi, Yokohama (JP); Yutaka Tasaki, Yokohama (JP); Yoshiteru Yasuda, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 393 days.

(21) Appl. No.: 14/383,627

(22) PCT Filed: Mar. 4, 2013

(86) PCT No.: PCT/JP2013/055830
§ 371 (c)(1),
(2) Date: Sep. 8, 2014

(87) PCT Pub. No.: WO2013/133206
PCT Pub. Date: Sep. 12, 2013

(65) Prior Publication Data
US 2015/0089960 A1    Apr. 2, 2015

(30) Foreign Application Priority Data

Mar. 9, 2012 (JP) ................................. 2012-053757

(51) Int. Cl.
*F25B 21/00*    (2006.01)

(52) U.S. Cl.
CPC ........ *F25B 21/00* (2013.01); *F25B 2321/002* (2013.01); *F25B 2321/0022* (2013.01); *Y02B 30/66* (2013.01)

(58) Field of Classification Search
CPC .... F25B 21/00; F25B 21/2321; F25B 21/002; F25B 21/0022; F25B 21/0023; Y02B 30/66

(Continued)

(56) References Cited

U.S. PATENT DOCUMENTS

| 4,642,994 A | * | 2/1987 | Barclay | ................... F25B 21/00 505/890 |
| 2007/0125094 A1 | * | 6/2007 | Iwasaki | .................. F25B 21/00 62/3.1 |
| 2009/0308080 A1 | * | 12/2009 | Han | ....................... F25B 21/00 62/3.1 |

FOREIGN PATENT DOCUMENTS

JP        2007-147209 A    6/2007

\* cited by examiner

*Primary Examiner* — Frantz Jules
*Assistant Examiner* — Brian King
(74) *Attorney, Agent, or Firm* — Young Basile Hanlon & MacFarlane, P.C.

(57) ABSTRACT

A magnetic air conditioner includes heat generation disks of a hollow shape each having a magneto-caloric material and a thermal switch, and magnetic field application disks of a hollow shape each having a magnetic field application unit that applies a magnetic field to the magneto-caloric material, the heat generation disks and the magnetic field application disks being alternately stacked. At least either of the heat generation disks and the magnetic field application disks is made to relatively rotate so as to transport heat in a direction intersecting the rotating direction. The magnetic air conditioner also includes an outer-rotor motor that causes at least one of the heat generation disks and the magnetic field application disks to rotate, and a clutch that transmits a driving force collectively to the plurality of heat generation disks or to the plurality of magnetic field application disks, or separately.

9 Claims, 13 Drawing Sheets

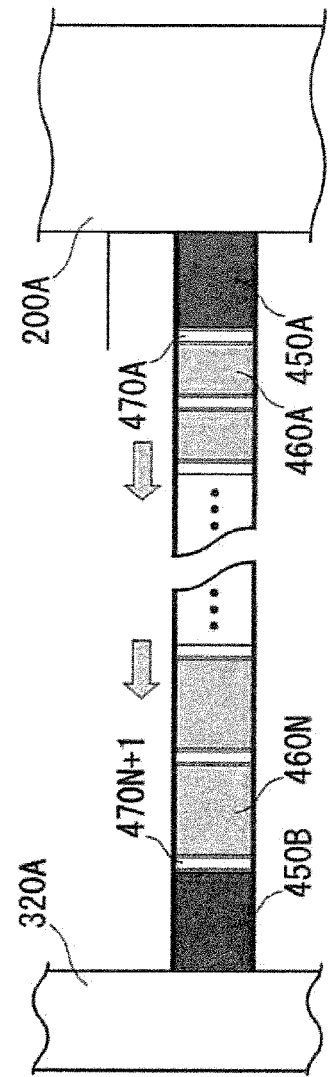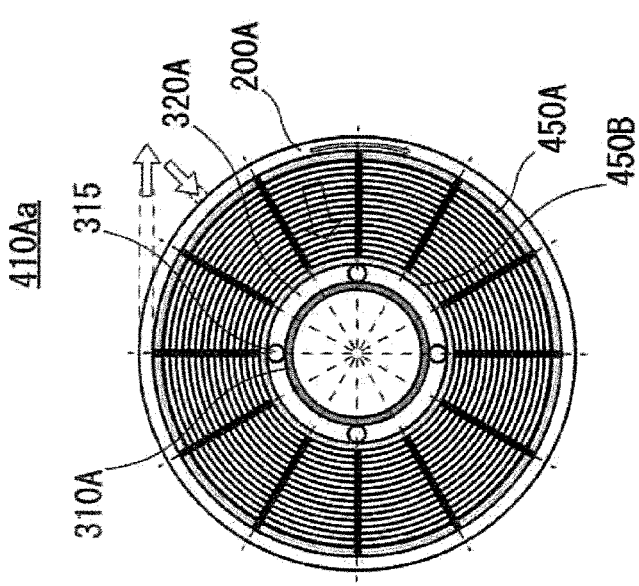
FIG.4B
FIG.4A

MAGNETIC AIR CONDITIONER

CROSS REFERENCE TO RELATED APPLICATION

The present application claims priority to Japanese Patent Application No. 2012-053757, filed Mar. 9, 2012, incorporated herein in its entirety.

TECHNICAL FIELD

The present invention relates to a magnetic air conditioner, in particular to a magnetic air conditioner capable of efficiently generating cool wind and hot wind according to required cooling performance and heating performance.

BACKGROUND

Most of conventional refrigerating machines of a room temperature range, including a refrigerator, a freezer, and an air conditioner utilize phase changes of a gas refrigerant such as chlorofluorocarbon (CFC) gas and alternative CFC. In recent years, depletion of ozone layer originating from emission of the chlorofluorocarbon gas has come to be a major issue. In addition, there is a growing concern about the impact of emission of the alternative CFC to the global warming. Accordingly, development of an innovative refrigerating machine, both clean to the environment and having high heat transport capacity, has been increasingly demanded as substitute for the refrigerating machine that employs the gas refrigerant such as the chlorofluorocarbon gas or alternative CFC.

As an outcome of the foregoing situation, a magnetic refrigeration technique is recently focused on. Some of magnetic bodies exhibit so-called a magneto-caloric effect, which makes the magnetic body to change its temperature according to a change in magnitude of the magnitude of the magnetic field applied to that magnetic body. The magnetic refrigeration technique is a technique to transport heat by means of the magnetic body that exhibits the magneto-caloric effect.

The refrigerating machines based on the magnetic refrigeration technique thus far developed include a magnetic refrigerating machine that transports heat utilizing thermal conduction of a solid substance, as disclosed in Publication of Japanese Patent Application 2007-147209. The magnetic refrigerating machine is configured to conduct heat as follows.

A plurality of positive magnetic bodies that increase their temperature when magnetism is applied thereto and a plurality of negative magnetic bodies that decrease their temperature are alternately aligned in one direction at predetermined intervals. A positive and negative pair of magnetic bodies constitutes a magnetic body block. A plurality of the magnetic body blocks aligned in one direction is arranged in an annular shape, to form a magnetic body unit. A permanent magnet is placed on a hub-shaped rotating body, concentric with the magnetic body unit and having generally the same inner diameter and outer diameter as the magnetic body unit, so as to form a magnet unit. A thermal conduction member to be inserted and removed in and from between the positive and negative magnetic bodies is slidably disposed therebetween.

The magnet unit including the permanent magnet is located so as to oppose the magnetic body unit and made to relatively rotate with respect to the magnetic body unit. The thermal conduction member to be inserted and removed in and from between the positive and negative magnetic bodies is made to relatively rotate with respect to the magnetic body unit. With the rotation of the magnet unit, magnetism is applied and removed to and from the positive and negative magnetic bodies at the same time. In addition, the thermal conduction member is inserted and removed in and from between the positive and negative magnetic bodies aligned in the rotating direction. With the rotation of the permanent magnet and the thermal conduction member, the heat generated by the magnetic bodies owing to the magneto-caloric effect is transported via the thermal conduction member in the one direction in which the magnetic bodies are arranged.

However, although Publication of Japanese Patent Application 2007-147209 discloses the magnetic refrigerating machine that transports the heat in one direction by utilizing the thermal conduction of a solid substance, there is no reference of a specific configuration for taking out the transported heat. The magnetic refrigerating machine has to have a configuration for efficiently taking out the transported heat. Unless the transported heat is efficiently taken out of the magnetic refrigerating machine the heat remains therein, and the thermal efficiency expected from the magnetic refrigerating machine is significantly degraded.

To take out the heat, normally a refrigerant path for hot wind and another refrigerant path for cool wind are respectively provided along an inner circumferential portion and an outer circumferential portion of the magnetic refrigerating machine, and air is made to flow through the refrigerant paths so as to obtain hot wind and cool wind. With such a method, however, simply providing the refrigerant paths is insufficient for efficiently generating cool wind and hot wind according to required cooling and heating performance.

SUMMARY

The present invention has been accomplished in view of the foregoing situation, and provides a magnetic air conditioner capable of efficiently generating cool wind and hot wind according to required cooling and heating performance.

Accordingly, the present invention provides a magnetic air conditioner including a plurality of heat generation disks of a hollow shape each having a magneto-caloric material and a thermal switch, and a plurality of magnetic field application disks of a hollow shape each having a magnetic field application unit that applies a magnetic field to the magneto-caloric material, the heat generation disks and the magnetic field application disks being alternately stacked. At least either of the heat generation disks and the magnetic field application disks are made to relatively rotate so as to transport heat in a direction intersecting the rotating direction.

The magnetic air conditioner includes a driver and a transmission device. The driver causes at least one of the heat generation disks and the magnetic field application disks to rotate. The transmission device transmits a driving force from the driver collectively to the plurality of heat generation disks or to the plurality of magnetic field application disks, or separately to one of a plurality of groups of the heat generation disks or the magnetic field application disks. To be more detailed, when relatively low cooling and heating performance is required the transmission device transmits the driving force to a part of the heat generation disks or the magnetic field application disks. In contrast, when relatively high cooling and heating performance is required, the transmission device transmits the driving force to all of the heat generation disks or the magnetic field application disks.

With the magnetic air conditioner configured as above according to the present invention, the driving force can be transmitted to all of the heat generation disks or magnetic field application disks collectively or to one or more of the divided groups. Such a configuration enables cool wind and hot wind to be efficiently generated according to the required cooling and heating performance.

BRIEF DESCRIPTION OF THE DRAWINGS

FIGS. 4A and 4B are schematic plan views of a heat generation disk.

DESCRIPTION OF THE EMBODIMENTS

Hereafter, a magnetic air conditioner according to an embodiment of the present invention will be described.

Figure 1:
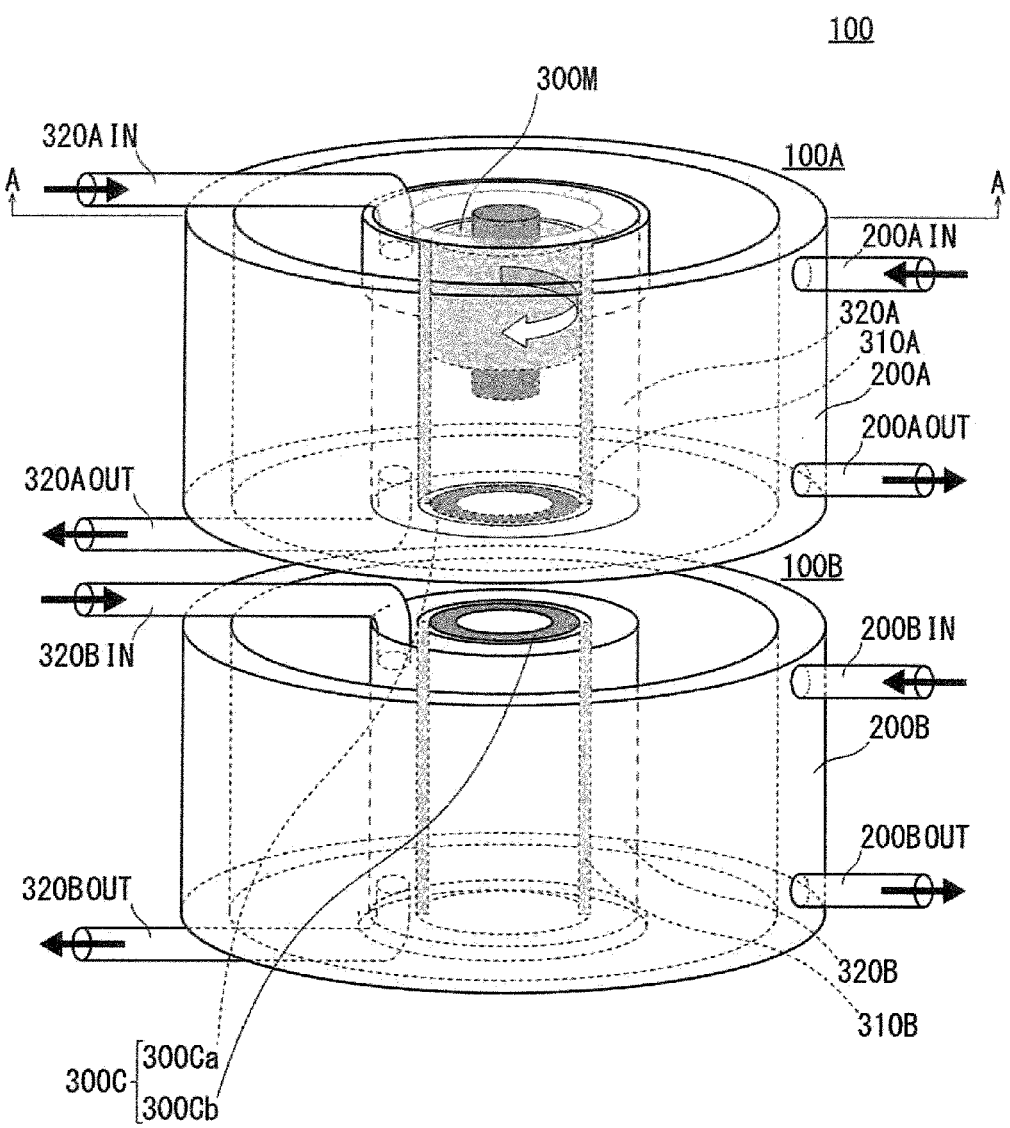
FIG. 1 is a perspective view showing an appearance of a magnetic air conditioner according to an embodiment.

FIG. 1 is a perspective view showing an appearance of a magnetic air conditioner according to this embodiment. As shown in the drawing, the magnetic air conditioner 100 has a column-shaped appearance.

The magnetic air conditioner 100 includes a pair of cores, namely an upper core 100A and a lower core 100B. The upper core 100A and the lower core 100B are both formed in a cylindrical shape having the same diameter.

The upper core 100A includes an outer circumferential refrigerant path 200A formed in a concentric cylindrical shape along the entirety of the outer circumferential portion, so as to extend from the bottom face of the upper core 100A to the top face thereof. The top face and the bottom face of the outer circumferential refrigerant path 200A are closed. An air inlet 200AIN is attached at an upper position of the upper core 100A, for introducing air, which serves as the refrigerant, into the outer circumferential refrigerant path 200A. At a lower position of the upper core 100A, an air outlet 200AOUT is provided for discharging the air introduced through the air inlet 200AIN. Accordingly, the air introduced through the air inlet 210AIN flows out through the air outlet 200AOUT, in the outer circumferential refrigerant path 200A.

In this embodiment, the air introduced through the air inlet 200AIN and flowing through inside the outer circumferential refrigerant path 200A is cooled on its way to the air outlet 200AOUT. Here, although air is adopted as an example of the refrigerant in this embodiment, a gas refrigerant other than air may be employed, provided that the gas refrigerant has a better thermal conduction characteristic than air. Alternatively, a liquid or a liquid metal may be employed as the refrigerant.

An outer-rotor motor 300M, corresponding to the driver in the present invention, is mounted at a central position of the upper face of the upper core 100A. A cylindrical rotor 310A is attached to the outer circumferential portion of the outer-rotor motor 300M. A clutch element 300Ca, corresponding to the transmission device in the present invention, is attached to a lower end portion of the rotor 310A.

An inner circumferential refrigerant path 320A is formed in a region between the outer circumferential surface of the rotor 310A and a wall spaced from the outer circumferential surface of the rotor 310A by a predetermined distance, in a concentric cylindrical shape extending along the outer circumferential surface of the rotor 310A from the bottom face of the upper core 100A to the top face thereof. The top face and the bottom face of the inner circumferential refrigerant path 320A are closed, as with the outer circumferential refrigerant path 200A. An air inlet 320AIN is attached on the top face of the upper core 100A, for introducing air into the inner circumferential refrigerant path 320A. On the bottom face of the upper core 100A, an air outlet 320AOUT is provided for discharging the air introduced through the air inlet 320AIN. Accordingly, the air introduced through the air inlet 320AIN flows out through the air outlet 320AOUT, in the inner circumferential refrigerant path 320A.

In this embodiment, the air introduced through the air inlet 320AIN and flowing through inside the inner circumferential refrigerant path 320A is heated on its way to the air outlet 320AOUT.

In the mentioned configuration, the air introduced through the air inlet 200AIN of the outer circumferential refrigerant path 200A is cooled inside the outer circumferential refrigerant path 200A. Conversely, the air introduced through the air inlet 200AIN of the outer circumferential refrigerant path 200A may be heated inside the outer circumferential refrigerant path 200A. Likewise, although the air introduced through the air inlet 330AIN of the inner circumferential refrigerant path 320A is heated inside the inner circumferential refrigerant path 320A in the mentioned configuration, the air introduced through the air inlet 330AIN of the inner circumferential refrigerant path 320A may be cooled inside the inner circumferential refrigerant path 320A.

The lower core 100B includes an outer circumferential refrigerant path 200B formed in a concentric cylindrical shape along the entirety of the outer circumferential portion, so as to extend from the bottom face of the lower core 100B to the top face thereof. The top face and the bottom face of the outer circumferential refrigerant path 200B are closed. An air inlet 200BIN is attached at an upper position of the lower core 100B, for introducing air into the outer circumferential refrigerant path 200B. At a lower position of the lower core 100B, an air outlet 200BOUT is provided for discharging the air introduced through the air inlet 200BIN. Accordingly, the air introduced through the air inlet 210BIN flows out through the air outlet 200BOUT, in the outer circumferential refrigerant path 200B.

In this embodiment, the air introduced through the air inlet 200BIN and flowing through inside the outer circumferential refrigerant path 200B is cooled on its way to the air outlet 200BOUT.

A clutch element 300Cb is attached to a central position of the top face of the lower core 100B, and is connected to the clutch element 300Ca attached to the lower end portion of the rotor 310A in the upper core 100A. To the clutch element 300Cb, a cylindrical rotor 310B is attached.

An inner circumferential refrigerant path 320B is formed in a region between the outer circumferential surface of the rotor 310B and a portion spaced from the outer circumferential surface of the rotor 310B by a predetermined distance, in a concentric cylindrical shape extending along the outer circumferential surface of the rotor 310B from the bottom face of the upper core 100A to the top face thereof, as in the upper core 100A. The top face and the bottom face of the inner circumferential refrigerant path 320B are closed, as with the outer circumferential refrigerant path 200B. An air inlet 320BIN is attached on the top face of the lower core 100B, for introducing air into the inner circumferential refrigerant path 320B. On the bottom face of the lower core 100B, an air outlet 320BOUT is provided for discharging the air introduced through the air inlet 320BIN. Accordingly, the air introduced through the air inlet 320BIN flows out through the air outlet 320BOUT, in the inner circumferential refrigerant path 320B.

In this embodiment, the air introduced through the air inlet 320BIN and flowing through inside the inner circumferential refrigerant path 320B is heated on its way to the air outlet 320BOUT.

In the mentioned configuration, the air introduced through the air inlet 200BIN of the outer circumferential refrigerant path 200B is cooled inside the outer circumferential refrigerant path 200B and discharged through the air outlet 200BOUT. Conversely, the air introduced through the air inlet 200BIN of the outer circumferential refrigerant path 200B may be heated inside the outer circumferential refrigerant path 200B. Likewise, although the air introduced through the air inlet 330BIN of the inner circumferential refrigerant path 320B is heated inside the inner circumferential refrigerant path 320B in the mentioned configuration, the air introduced through the air inlet 330BIN of the inner circumferential refrigerant path 320B may be cooled inside the inner circumferential refrigerant path 320B. In this embodiment, the cooled air and the heated air are intended for use in a vehicle, for air conditioning of the cabin or for temperature control of the battery, inverter, or motor mounted in the vehicle.

Here, though not shown in FIG. 1, the air inlet 200AIN, the air inlet 320AIN, the air outlet 200AOUT, and the air outlet 320AOUT of the upper core 100A, and the air inlet 200BIN, the air inlet 320BIN, the air outlet 200BOUT, and the air outlet 320BOUT of the lower core 100B are connected to communication valves that allow communication between each of the air inlets and air outlets. In addition, air is supplied to the air inlet 200AIN, the air inlet 200BIN, the air inlet 320AIN, and the air inlet 320BIN from a pump provided outside. In this embodiment, a three-way valve is employed as the communication valve. The connection between the communication valve and the pump will be subsequently described.

Figure 2:
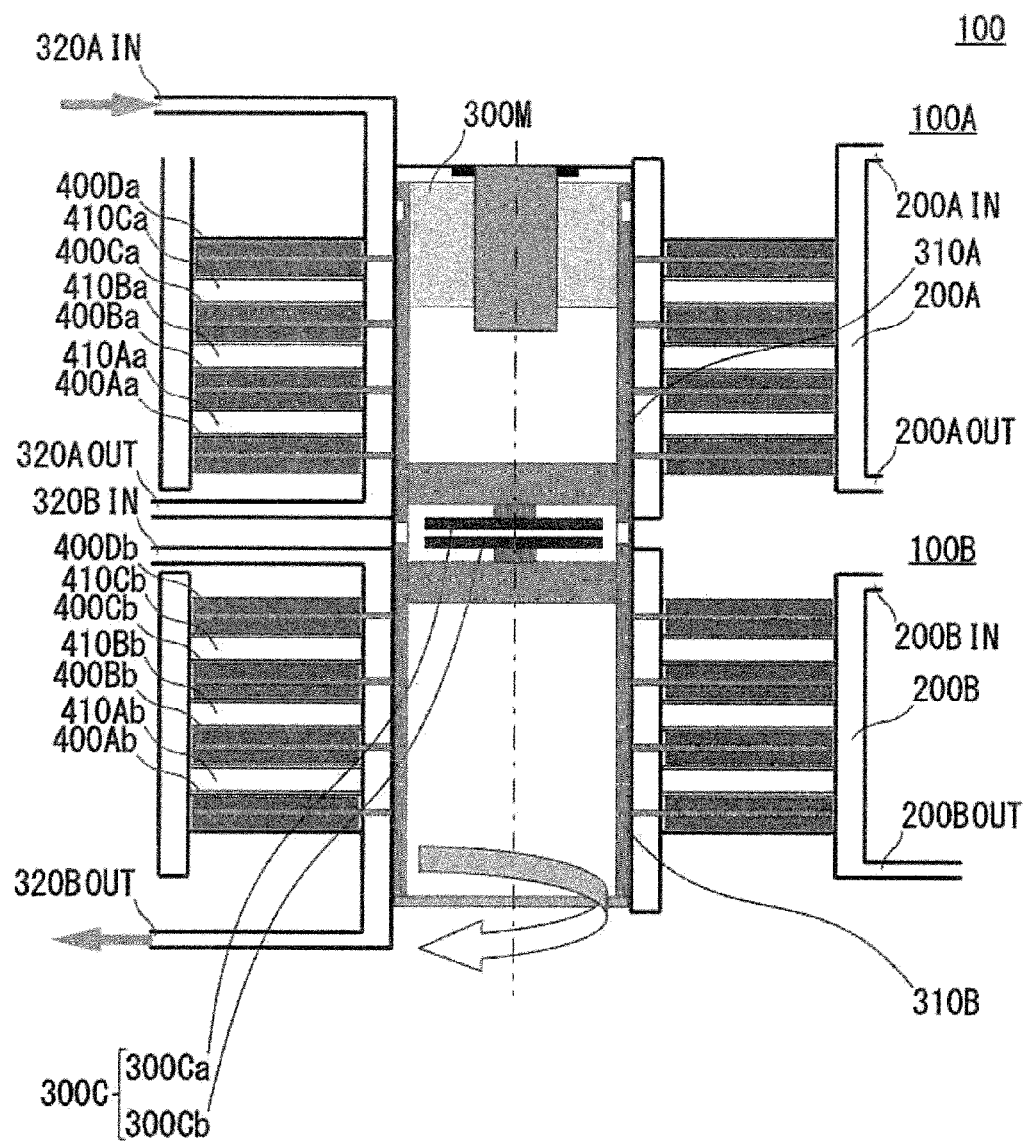
FIG. 2 is a cross-sectional view taken along a line A-A in FIG. 1.

FIG. 2 is a cross-sectional view taken along a line A-A in FIG. 1. As shown in FIG. 2, the magnetic air conditioner 100 is divided into the upper core 100A and the lower core 100B.

The upper core 100A and the lower core 100B respectively include the outer circumferential refrigerant paths 200A and 200B formed along the outer circumferential portion.

The outer-rotor motor 300M is mounted at the central position of the top face of the upper core 100A. The cylindrical rotor 310A is attached to the outer circumferential portion of the outer-rotor motor 300M. The clutch element 300Ca is attached to the lower end portion of the rotor 310A. The rotor 310A is made to rotate by the outer-rotor motor 300M in a direction indicated by an arrow in FIG. 2.

The clutch element 300Cb is attached to the central position of the top face of the lower core 100B, and is connected to the clutch element 300Ca attached to the lower end portion of the rotor 310A in the upper core 100A. To the clutch element 300Cb, the cylindrical rotor 310B is attached. The clutch element 300Ca and the 300Cb constitute an electromagnetic clutch 300C. When the clutch 300C is turned on the clutch element 300Ca and the 300Cb are connected to each other, so that the driving force of the outer-rotor motor 300M is transmitted from the rotor 310A to the rotor 310B, and the rotor 310B is made to rotate together with the rotor 310A.

Magnetic field application disks 400Aa, 400Ba, 400Ca, and 400Da of a hollow shape, each having a pair of magnetic field application units that apply a magnetic field to magneto-caloric materials, are attached to the rotor 310A. Likewise, magnetic field application disks 400Ab, 400Bb, 400Cb, 400Db of a hollow shape, each having a pair of magnetic field application units that apply a magnetic field to the magneto-caloric materials, are attached to the rotor 310B. The magnetic field application units are respectively formed on the front surface and the rear surface of each of the magnetic field application disks 400Aa to 400Da, 400Ab to 400Db.

The outer circumferential surface of the rotor 310A and the inner circumferential surface of the magnetic field application disks 400Aa to 400Da, as well as the outer circumferential surface of the rotor 300B and the inner circumferential surface of the magnetic field application disks 400Ab to 400Db are firmly fitted to each other. Accordingly, when the outer-rotor motor 300M rotates with the clutch 300C turned on, the rotor 310A and the 310B are made to rotate together, so that the magnetic field application disks 400Aa to 400Da and the magnetic field application disks 400Ab to 400Db are all made to rotate simultaneously. In contrast, when the clutch 300C is off only the rotor 310A is made to rotate, and hence only the magnetic field application disks 400Aa to 400Da are made to rotate. Thus, the plurality of magnetic field application disks can be unified and separated by turning on and off the clutch 300C as above.

In addition, heat generation disks 410Aa, 410Ba, 410Ca of a hollow shape each having the magneto-caloric materials and thermal switches are fixed to the rotor 310A, so as to be respectively interposed between the magnetic field application disks 400Aa, 400Ba, 400Ca, 400Da with a minute gap therebetween. Likewise, heat generation disks 410Ab, 410Bb, 410Cb of a hollow shape each having the magneto-caloric materials and the thermal switches are fixed to the rotor 310B, so as to be respectively interposed between the magnetic field application disks 400Ab, 400Bb, 400Cb, 400Db with a minute gap therebetween. In the upper core 100A and the lower core 100B, therefore, the magnetic field application disks and the heat generation disks are alternately stacked with the minute gap therebetween.

The magneto-caloric materials possess a characteristic of increasing their temperature when subjected to a magnetic field and decreasing their temperature when released from the magnetic field (positive magnetic body; magnetic bodies having the opposite characteristic also exist). In this embodiment, only either of the positive magnetic body or the negative magnetic body is employed as the magneto-caloric material. However, the positive magnetic body and the negative magnetic body may be employed in combination. The thermal switches are each provided between the magneto-caloric materials located adjacent to each other, and selectively transmit and disconnect heat between the magneto-caloric materials. In this embodiment, the temperature range in which the magneto-caloric material exhibits the magneto-caloric effect is set to be different between a group consisting of the heat generation disks 410Aa, 410Ba, 410Ca and the other group consisting of the heat generation disks 410Ab, 410Bb, 410Cb. This is because the temperatures of air introduced into the upper core 100A and the lower core 100B are different, and therefore cool wind and hot wind can be efficiently generated by properly selecting the temperature range for causing the magneto-caloric material to exhibit the magneto-caloric effect.

When the outer-rotor motor 300M rotates with the clutch 300C turned on, the rotor 310A and the 310B are made to rotate together, so that the magnetic field application disks 400Aa to 400Da and the magnetic field application disks 400Ab to 400Db are all made to rotate simultaneously. Then a magnetic field is repeatedly applied to each of the heat generation disks 410Aa to 410Ca and the heat generation disks 410Ab to 410Cb, and heat is transferred in a direction intersecting the rotating direction of the magnetic field application disks.

In the configuration according to this embodiment, the heat is transferred from the outer circumferential side to the inner circumferential side of the heat generation disks 410Aa to 410Ca and the heat generation disks 410Ab to 410Cb. Therefore, the temperature drops on the outer circumferential side of the heat generation disks 410Aa to 410Ca and the heat generation disks 410Ab to 410Cb, and the temperature rises on the inner circumferential side thereof. Conversely, the upper core 100A and the lower core 100B may be configured so as to transfer the heat from the inner circumferential side to the outer circumferential side of the heat generation disks 410Aa to 410Ca and the heat generation disks 410Ab to 410Cb. In this case, the temperature rises on the outer circumferential side of the heat generation disks 410Aa to 410Ca and the heat generation disks 410Ab to 410Cb, and the temperature drops on the inner circumferential side thereof.

Figure 3A:
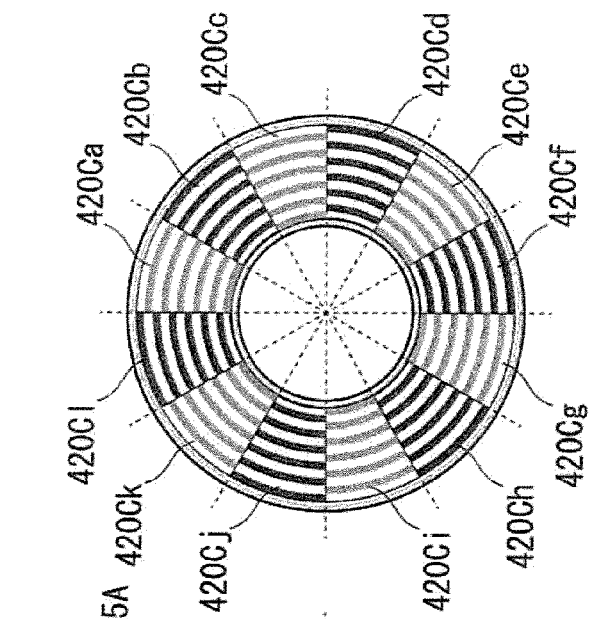
FIGS. 3A to 3C are schematic plan views showing configurations of a magnetic field application disk.
Figure 3B:
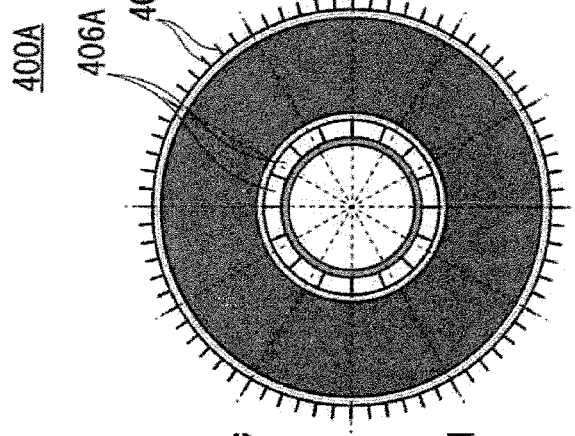
Figure 3C:
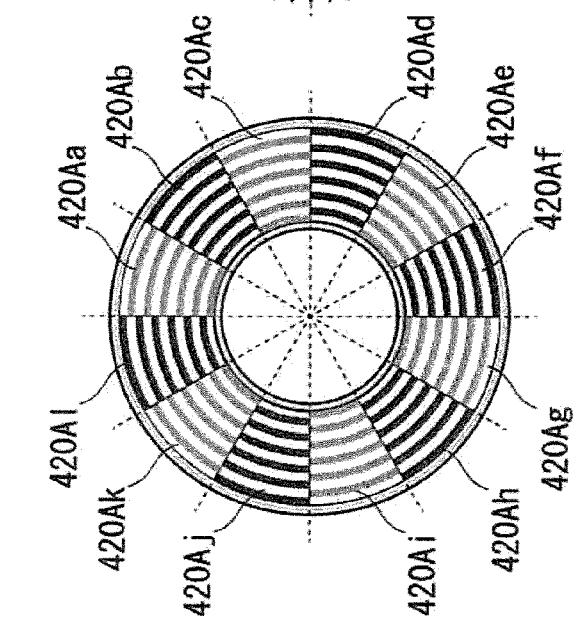

FIGS. 3A-3C are schematic plan views showing the configuration of the magnetic field application disk, in particular the magnetic field application disk 400Aa shown in FIG. 2. The remaining magnetic field application disks 400Ba to 400Da and 400Ab to 400Db have the same configuration as the magnetic field application disk 400A.

FIG. 3A illustrates the front surface of the magnetic field application disk 400Aa shown in FIG. 3B, and the FIG. 3C illustrates the rear surface thereof. As shown in FIG. 3B, the magnetic field application disk 400Aa has a disk shape. As shown in FIG. 3A and FIG. 3C, the front surface and the rear surface of the magnetic field application disk 400Aa each include twelve regions radially divided by 30 degrees.

As shown in FIG. 3A, the magnetic field application units 420Aa, 420Ab, . . . , 420Ak, and 420Al are respectively provided in the twelve regions on the front surface of the magnetic field application disk 400A. As shown in FIG. 3C, the magnetic field application units 420Ca, 420Cb, . . . , 420Ck, and 420Cl are respectively provided in the twelve regions on the rear surface of the magnetic field application disk 400A.

In the magnetic field application units 420Aa to 420Al on the front surface and in the magnetic field application units 420Ca to 420Cl on the rear surface of the magnetic field application disk 400A, permanent magnets are located at the same positions on the front surface and the rear surface. For example, as shown in FIG. 3A, the permanent magnets are arranged in the same way in the magnetic field application unit 420Aa and the magnetic field application unit 420Ca, in the radial direction of the magnetic field application disk 400A. This also applies to the magnetic field application units 420Ab and 420Cb, . . . , and the magnetic field application units 420Al and 420Cl.

On the front surface and the rear surface of the magnetic field application disk 400A, the permanent magnets in one of the magnetic field application units are radially shifted from those in the adjacent magnetic field application unit, by the thickness of a single permanent magnet. For example, regarding the magnetic field application units 420Aa, 420Ab, and 420Ac, the permanent magnets provided in the magnetic field application units 420Aa and 420Ac, which are adjacent to the magnetic field application unit 420Ab, are shifted from the permanent magnets provided in the magnetic field application unit 420Ab in the radial direction of the magnetic field application disk 400A by the thickness of a single permanent magnet.

FIGS. 4A and 4B show the configuration of the heat generation disk. In particular in FIGS. 4A and 4B, the heat generation disk 410Aa shown in FIG. 2. The remaining heat generation disks 410Ba to 410Ca and 410Ab to 410Cb have the same configuration as the heat generation disk 410Aa.

As shown in FIG. 4A, the heat generation disk 410Aa has its outer circumferential edge facing the outer circumferential refrigerant path 200A, and has its inner circumferential edge facing the inner circumferential refrigerant path 320A. The inner circumferential edge of the heat generation disk 410Aa is fixed to the rotor 310A via bearings 315. The rotor 310A can freely rotate with respect to the heat generation disk 410Aa fixed thereto, via the bearing 315.

As shown in FIG. 4A and FIG. 4B, the heat generation disk 410Aa includes a low temperature-side heat exchange unit 450A located at the position facing the outer circumferential refrigerant path 200A (outer circumferential edge), and a high temperature-side heat exchange unit 450B located at the position facing the inner circumferential refrigerant path 320A (inner circumferential edge).

As shown in FIG. 4A, the heat generation disk 410Aa includes twelve regions radially divided by 30 degrees. As shown in FIG. 4B, in each of the twelve regions rows of positive magneto-caloric materials 460A to 460N and rows of the thermal switches 470A to 470N+1 are alternately aligned between the low temperature-side heat exchange unit 450A and the high temperature-side heat exchange unit 450B. Although the positive magneto-caloric materials are employed in the example shown in FIGS. 4A and 4B, negative magneto-caloric materials may be employed instead.

The magnetic field application disks 400Aa and 400Ba rotate with the heat generation disk 410Aa interposed therebetween, as shown in FIG. 2. When the magnetic field application disks 400Aa and 400Ba rotate, the magneto-caloric materials 460A to 460N provided on the heat generation disk 410Aa are repeatedly subjected to and released from magnetism, and thus repeatedly generates and adsorbs heat. The magneto-caloric materials 460A to 460N and the thermal switches 470A to 470N+1 provided between the low temperature-side heat exchange unit 450A and the high temperature-side heat exchange unit 450B transmit the heat at predetermined timings. Accordingly, the heat generated by the magneto-caloric materials 460A to 460N is transferred from the low temperature-side heat exchange unit 450A to the high temperature-side heat exchange unit 450B, and hence the temperature of the low temperature-side heat exchange unit 450A drops and the temperature of the high temperature-side heat exchange unit 450B rises.

Upon supplying ambient air to the air inlets 200AIN and 320AIN (see FIG. 1) with the clutch 300C turned off and activating the outer-rotor motor 300M to rotate the rotor 310A, the heat is transferred from the low temperature-side heat exchange unit 450A toward the high temperature-side heat exchange unit 450B as shown in FIG. 4A, in all of the twelve regions of the heat generation disks 410Aa to 410Ca.

Therefore, the temperature of the low temperature-side heat exchange unit 450A becomes relatively lower than the temperature of the high temperature-side heat exchange unit 450B, and cool wind can be obtained in the outer circumferential refrigerant path 200A faced by the low temperature-side heat exchange unit 450A. Likewise, the temperature of the high temperature-side heat exchange unit 450B becomes relatively higher than the temperature of the low temperature-side heat exchange unit 450A, and hot wind can be obtained in the inner circumferential refrigerant path 320A faced by the high temperature-side heat exchange unit 450B. This also applies to the case where the rotor 310B is made to rotate.

In this embodiment, the temperature range in which the magneto-caloric materials 460A to 460N provided on the heat generation disks 410Aa to 410Ca effectively exhibit the magneto-caloric effect and the temperature range in which the magneto-caloric materials 460A to 460N provided on the heat generation disks 410Ab to 410Cb effectively exhibit the magneto-caloric effect are set to be different from each other. This is because, as shown in FIG. 1, the temperatures of air introduced into the upper core 100A and the lower core 100B are not the same.

In this embodiment, the air inlet 200AIN, the air inlet 320AIN, the air outlet 200AOUT, and the air outlet 320AOUT of the upper core 100A, and the air inlet 200BIN, the air inlet 320BIN, the air outlet 200BOUT, and the air outlet 320BOUT of the lower core 100B are connected via the non-illustrated communication valves, so as to allow the generation capacity of the cool wind and hot wind to be adjusted.

For example, when high cooling performance is required, the respective refrigerant paths of the upper core 100A and the lower core 100B are connected in series. To be more detailed, the air outlet 200AOUT of the upper core 100A is connected to the air inlet 200BIN of the lower core 100B, and the air outlet 320AOUT of the upper core 100A is serially connected to the air inlet 200BIN of the lower core 100B. Then upon rotating the outer-rotor motor 300M with the clutch 300C turned on, very cold air cooled by the upper core 200A and the lower core 200B can be taken out through the air outlet 200BOUT of the lower core 100B. Likewise, hot air heated by the upper core 200A and the lower core 200B can be taken out through the air outlet 320BOUT of the lower core 100B.

When high cooling performance is not required, the refrigerant paths of the upper core 100A and the lower core 100B are disconnected from each other. Air introduced through the air inlet 200AIN of the upper core 100A is taken out through the air outlet 200AOUT, and air introduced through the air inlet 320AIN of the upper core 100A is taken out through the air outlet 320AOUT. Upon rotating the outer-rotor motor 300M with the clutch 300C turned off, the air cooled only by the upper core 200A can be taken out through the air outlet 200AOUT of the upper core 100A. Likewise, the air heated only by the upper core 200A can be taken out through the air outlet 320OUT.

Further, when the refrigerant paths of the upper core 100A and the lower core 100B are disconnected from each other, the air introduced through the air inlet 200BIN of the lower core 100B can be taken out through the air outlet 200BOUT, and the air introduced through the air inlet 320BIN of the lower core 100B can be taken out through the air outlet 320BOUT. In this case, upon rotating the outer-rotor motor 300M with the clutch 300C turned on the air cooled by the upper core 200A and the lower core 200B can be taken out through the air outlet 200AOUT and the 200BOUT respectively, and the air heated by the upper core 200A and the lower core 200B can be taken out through the air outlet 320AOUT and the 320BOUT, respectively.

Thus, the magnetic air conditioner 100 according to this embodiment is capable of performing various operation modes by changing the connection status of the communication valves according to the required cooling and heating performance. The operation modes can be switched by changing the connection status between refrigerant pipes and the communication valves as described hereunder.

Figure 5:
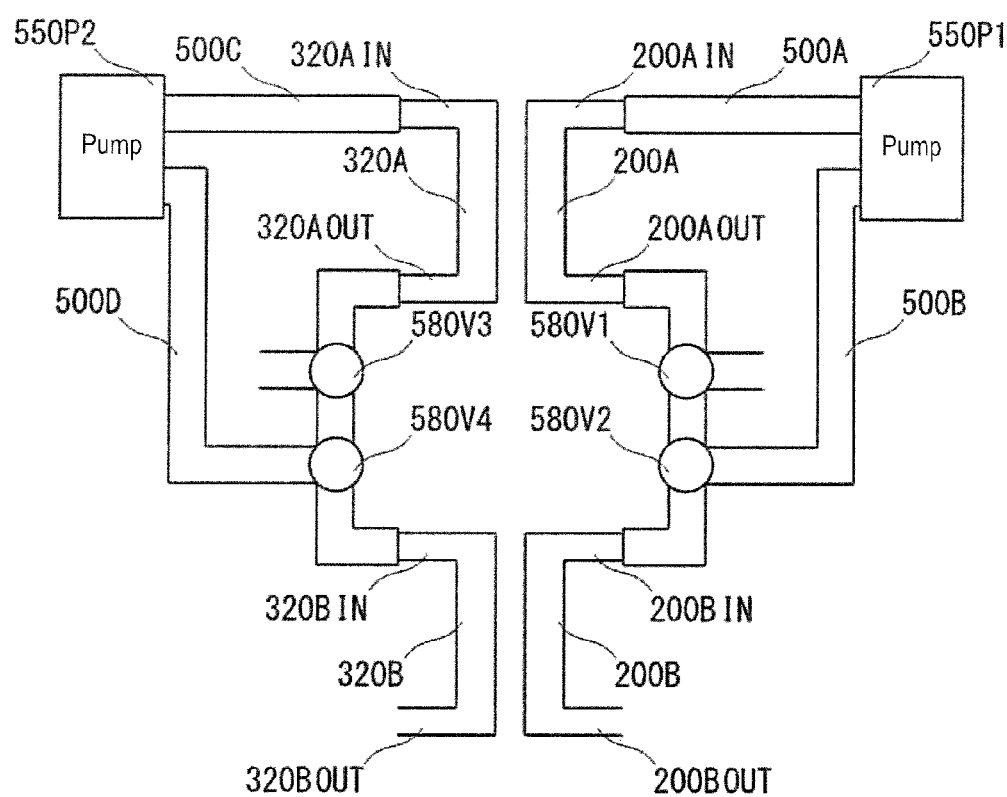
FIG. 5 is a block diagram showing details of communication valves of the magnetic air conditioner according to the embodiment.

FIG. 5 is a block diagram showing details of the communication valves of the magnetic air conditioner according to this embodiment. As shown in FIG. 5, the air inlet 200AIN connected to the outer circumferential refrigerant path 200A is connected to a pump 550P1 via a pipe 500A. The air outlet 200AOUT connected to the outer circumferential refrigerant path 200A is connected to an air-conditioning target (in this embodiment, cabin of the vehicle, and battery, inverter, and motor installed in the vehicle) via a three-way valve 580V1. The air inlet 200BIN connected to the outer circumferential refrigerant path 200B is connected to a three-way valve 580V2, which is connected to the pump 550P1 via a pipe 500B. The air outlet 200BOUT connected to the outer circumferential refrigerant path 200B communicates with the air-conditioning target.

Further, as shown in the drawing, the air inlet 320AIN connected to the inner circumferential refrigerant path 320A is connected to a pump 550P2 via a pipe 500C. The air outlet 320BOUT connected to the inner circumferential refrigerant path 200B communicates with the air-conditioning target via a three-way valve 580V3. The air inlet 320BIN connected to the inner circumferential refrigerant path 320B is connected to a three-way valve 580V4, which is connected to the pump 550P2 via a pipe 500D. The air outlet 320BOUT connected to the inner circumferential refrigerant path 320B communicates with the air-conditioning target.

Figure 6:
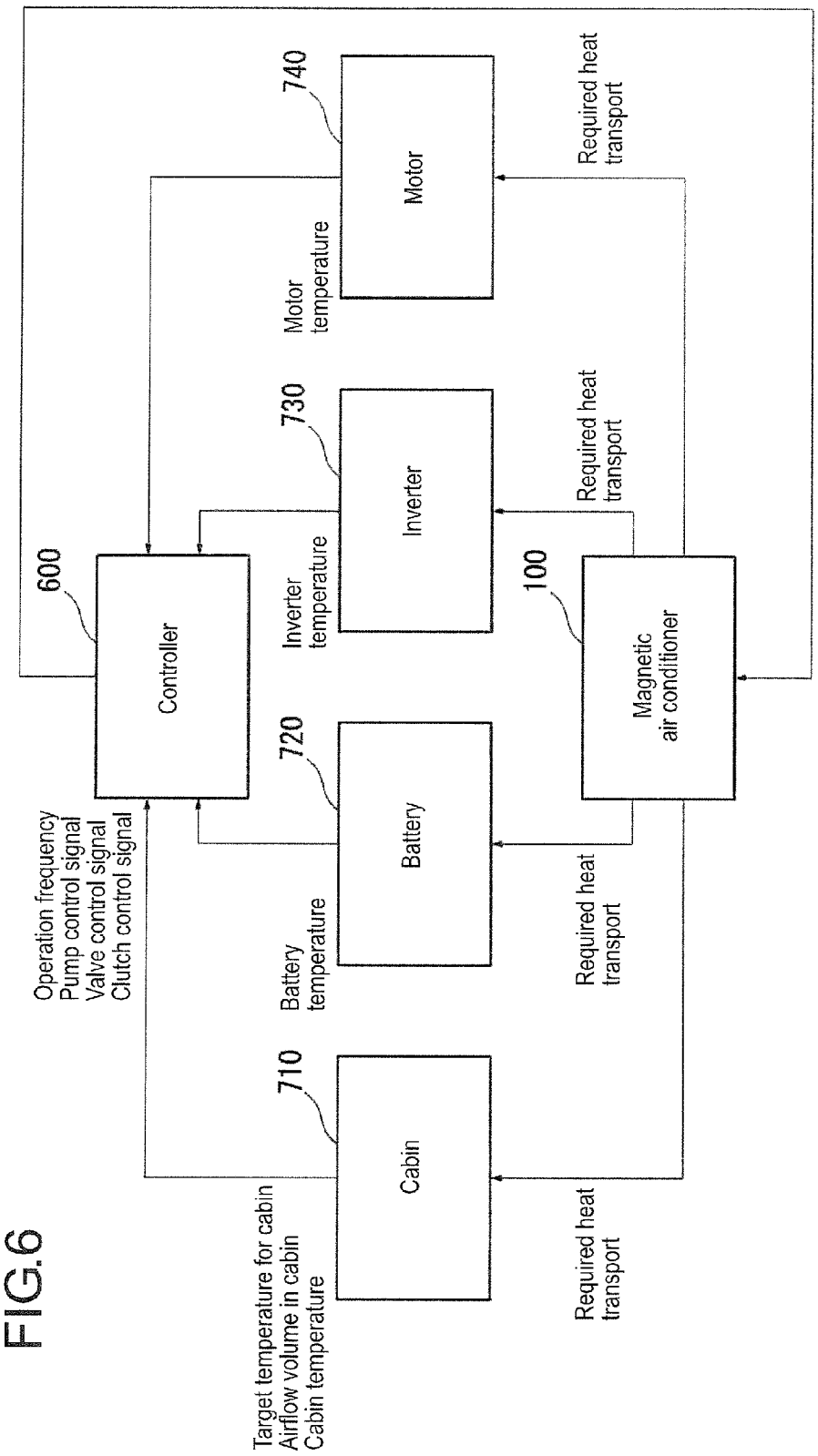
FIG. 6 is a block diagram showing supply destinations of air-conditioning wind of the magnetic air conditioner according to the embodiment, for explaining an outline of a control process based on a signal from the supply destinations of the air-conditioning wind.

FIG. 6 is a block diagram showing supply destinations of the air-conditioning wind of the magnetic air conditioner 100 according to this embodiment, for explaining an outline of a control process based on the signal from the supply destinations of the air-conditioning wind.

A controller 600 of the magnetic air conditioner 100 acquires information about the air conditioning of a cabin 710. More specifically, the information about the air conditioning of the cabin 710 includes a target temperature for the cabin set by a temperature setting unit, the airflow volume in the cabin, and the temperature in the cabin detected by a cabin temperature sensor. The controller 600 also acquires the temperature of a battery 720 installed in the vehicle, the temperature of an inverter 730 installed in the vehicle, and the temperature of a motor 740 that drives the vehicle.

The controller 600 receives inputs of the target temperature for the cabin, the airflow volume in the cabin, the temperature in the cabin, the temperature of the battery 720, the temperature of the inverter 730, and the temperature of the motor 740. The controller 600 outputs an operation frequency (rotating speed) of the outer-rotor motor 300M (see FIG. 1 and FIG. 2), a pump control signal for turning on and off the pump as will be subsequently described, a valve control signal for setting the position of the three-way valve to be subsequently described, and a clutch control signal for turning on and off the clutch 300C (see FIG. 1 and FIG. 2), to the magnetic air conditioner 100.

The magnetic air conditioner 100 controls the rotating speed of the outer-rotor motor 300M, the on/off status of the pump, the position of the three-way valve, and the on/off status of the clutch 300C according to the mentioned control signals, so as to supply the air-conditioning wind having the required heat quantity to the cabin 710, the battery 720, the inverter 730, and the motor 740.

Figure 7:
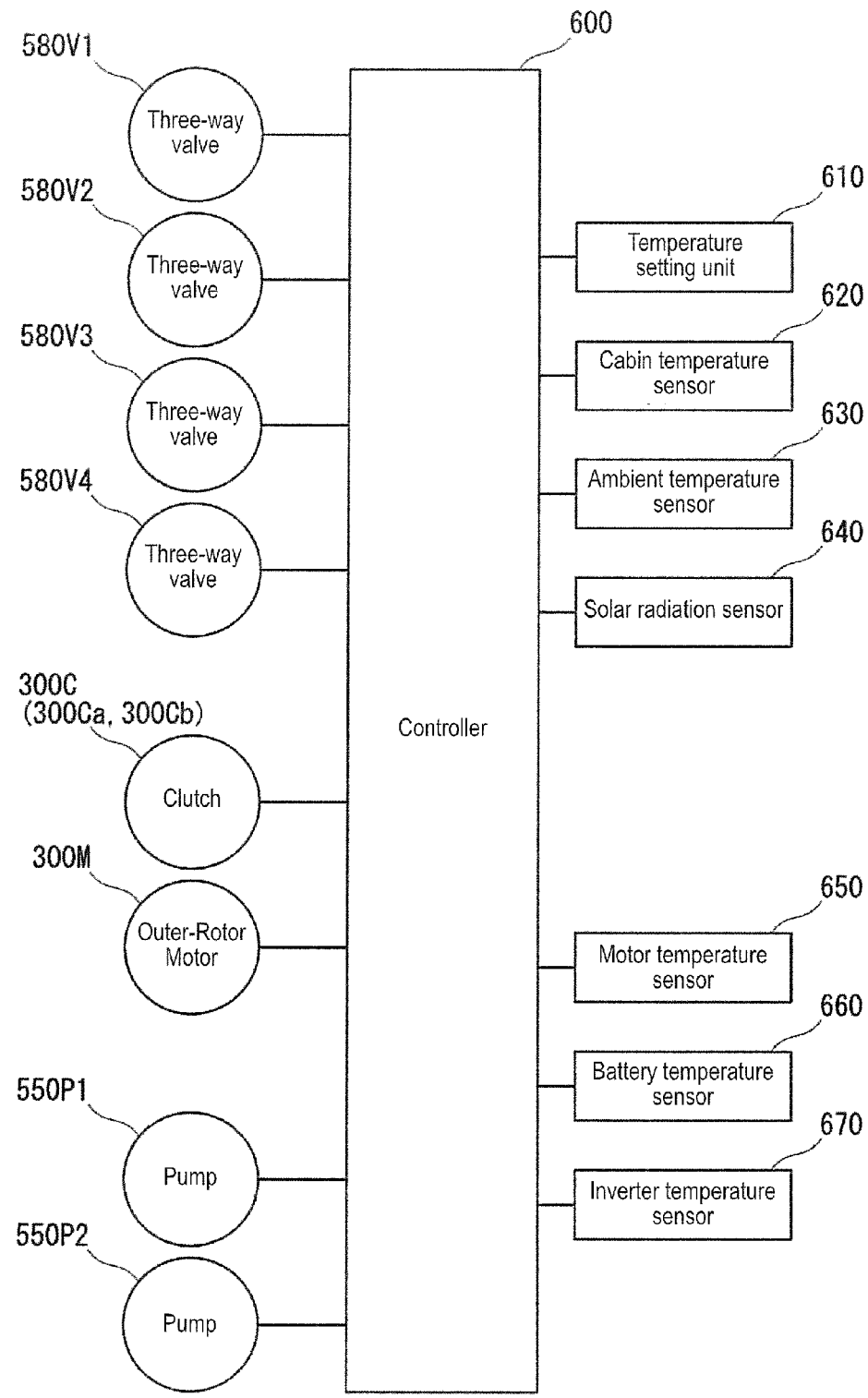
FIG. 7 is a block diagram showing a control system of the magnetic air conditioner according to the embodiment.

The operation of the magnetic air conditioner 100 according to this embodiment is controlled by the controller 600. FIG. 7 is a block diagram showing a control system of the magnetic air conditioner 100 according to this embodiment.

To the controller 600, the three-way valve 580V1, the three-way valve 580V2, the three-way valve 580V3, and the three-way valve 580V4 shown in FIG. 5 are connected. The position of each of the three-way valves is controlled by the controller 600.

The clutch 300C (300Ca, 300Cb) and the outer-rotor motor 300M are also connected to the controller 600. The on/off status of the clutch 300C and the rotating speed of the outer-rotor motor 300M are controlled by the controller 600. The controller 600 operates the three-way valve 580V1, the three-way valve 580V2, the three-way valve 580V3, and the three-way valve 580V4 in linkage with the operation of the clutch 300C.

The pump 550P1 and the pump 550P2 are also connected to the controller 600. The on/off status of the pump 550P1 and the pump 550P2 is controlled by the controller 600.

The temperature setting unit 610, a cabin temperature sensor 620, an ambient temperature sensor 630, a solar radiation sensor 640, a motor temperature sensor 650, a battery temperature sensor 660, and an inverter temperature sensor 670 are connected to the controller 600.

The temperature setting unit 610 is for example provided in the cabin of the vehicle, for the passenger to set a target temperature for the cabin. The cabin temperature sensor 620 detects the temperature in the cabin. The ambient temperature sensor 630 detects the temperature of air outside of the cabin. The solar radiation sensor 640 detects the amount of solar radiation entering the cabin. The motor temperature sensor 650 detects the temperature of the motor 740. The battery temperature sensor 660 detects the temperature of the battery 720 installed in the vehicle. The inverter temperature sensor 670 detects the temperature of the inverter 730 that drives the motor 740. The motor temperature sensor 650, the battery temperature sensor 660, and the inverter temperature sensor 670 are provided for the purpose of immediately detecting abnormality in the motor 740 upon occurrence thereof. When the temperature of the motor 740, the battery 720, or the inverter 730 rises, cool wind is supplied from the magnetic air conditioner 100.

Referring now to operation flowcharts shown in FIG. 8 through FIG. 12, the operation of the controller 600 will be described hereunder.

Figure 8:
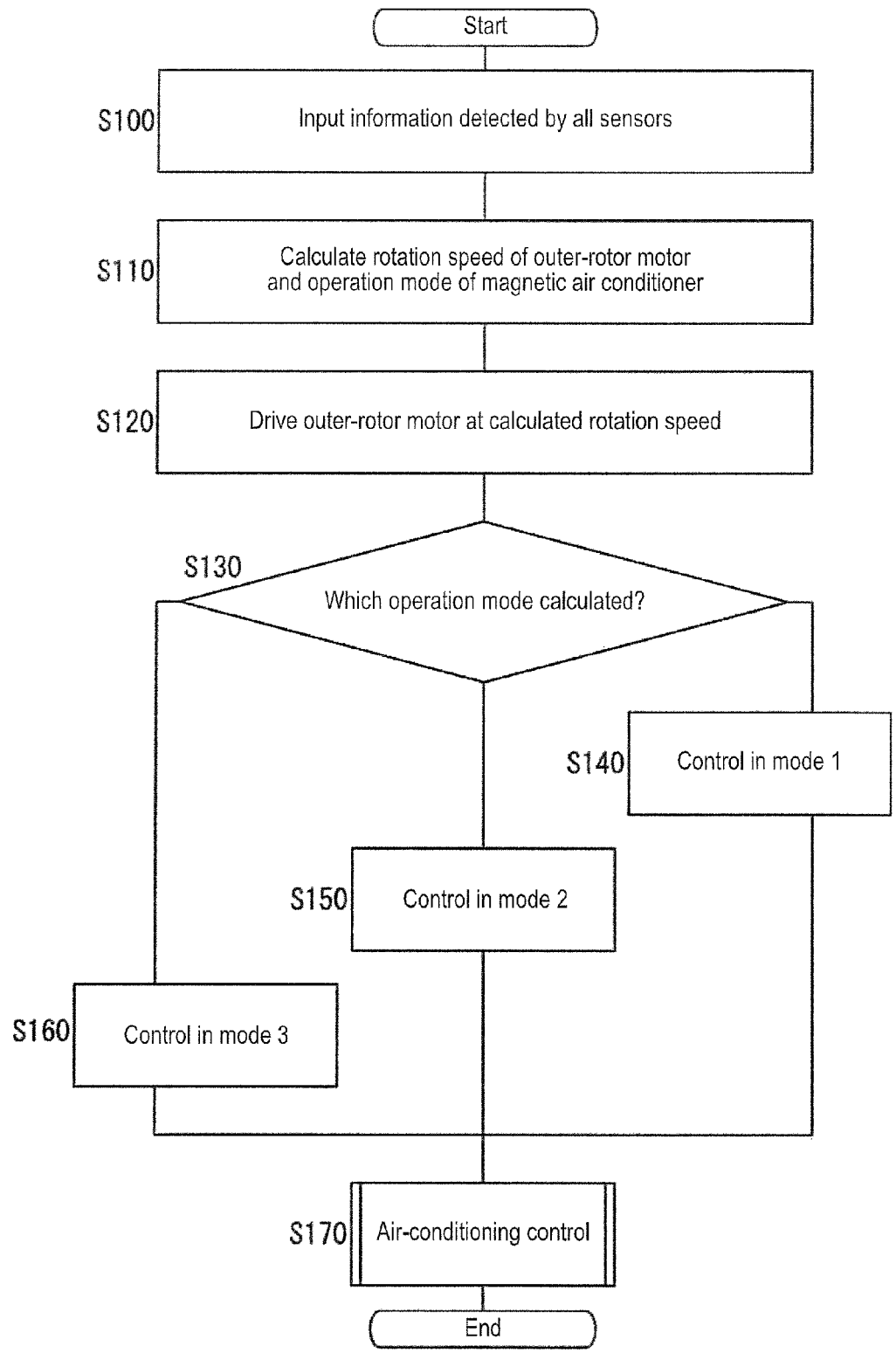
FIG. 8 is an operation flowchart of a controller.

As shown in FIG. 8, the controller 600 receives the inputs of the information detected by the temperature setting unit 610, the cabin temperature sensor 620, the ambient temperature sensor 630, the solar radiation sensor 640, the motor temperature sensor 650, the battery temperature sensor 660, and the inverter temperature sensor 670. In other words, the information detected by all the sensors is inputted to the controller 600 (S100).

The controller 600 calculates a cooling load or heating load on the basis of the information inputted from those sensors, and calculates the rotating speed of the outer-rotor motor 300M and the operation mode of the magnetic air conditioner 100 from the calculation result (S110).

The controller 600 drives the outer-rotor motor 300M at the rotating speed calculated as above (S120).

The controller 600 decides to which the calculated operation mode of the magnetic air conditioner 100 corresponds, among the mode 1 to the mode 3 (S130).

The controller 600 performs the control for the mode 1 in the case where the calculated operation mode of the magnetic air conditioner 100 is the mode 1 (S140), performs the control for the mode 2 in the case where the calculated operation mode is the mode 2 (S150), and performs the control for the mode 3 in the case where the calculated operation mode is the mode 3 (S160).

Then the controller 600 executes the air conditioning control according to the calculated operation mode of the magnetic air conditioner 100 (S170).

Figure 9:
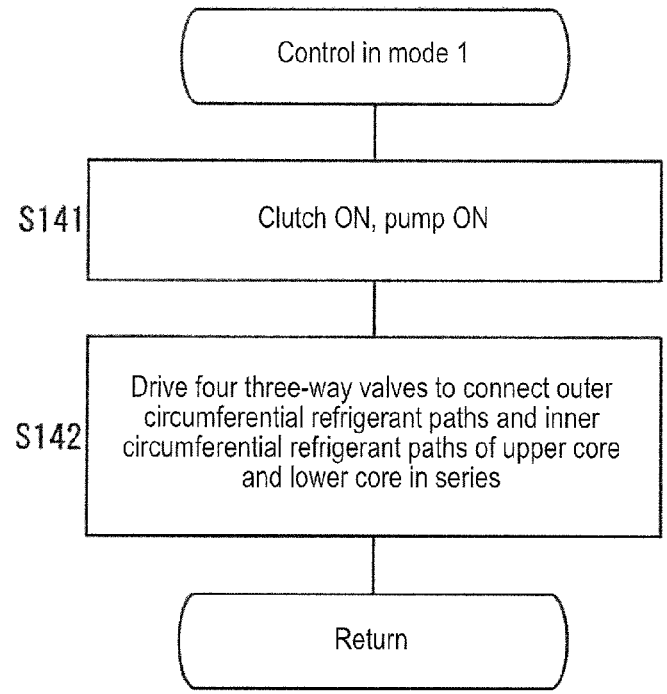
FIG. 9 is an operation flowchart of mode 1 performed by the controller.

FIG. 9 is an operation flowchart of the mode 1 performed by the controller 600. The mode 1 is the operation mode in which the magnetic air conditioner 100 works with the upper core 100A and the lower core 100B connected in series, as shown in the column of the mode 1 in FIG. 14.

Figure 14:
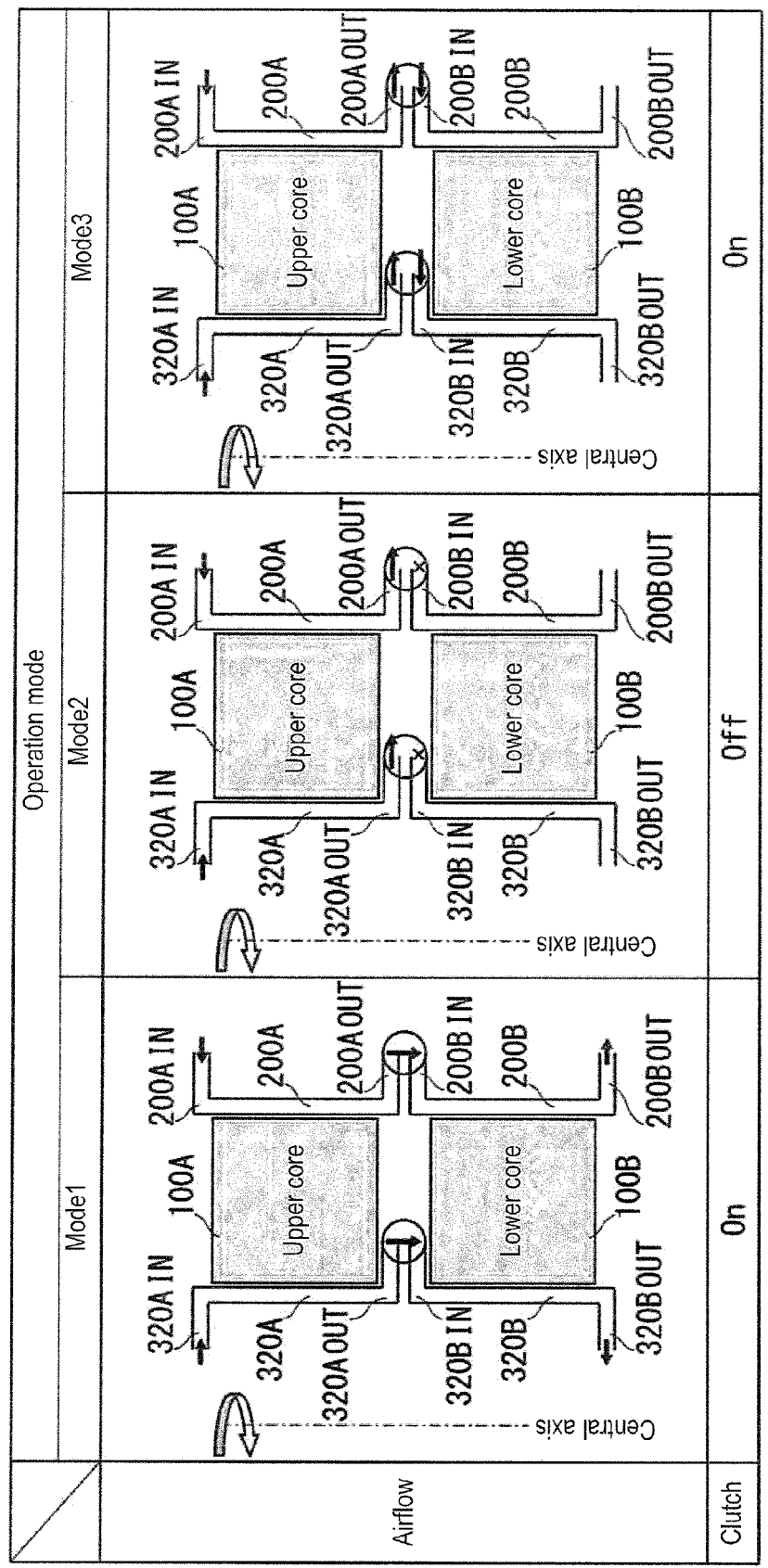
FIG. 14 is a table for explaining airflows in each of the operation modes.

The mode 1 is the operation mode in which an airflow shown in the column of the mode 1 in FIG. 14 is created. The air outlet 200AOUT of the upper core 100A and the air inlet 200BIN of the lower core 100B are made to communicate with each other, so that air is introduced through the air inlet 200AIN to be cooled in the outer circumferential refrigerant paths 200A and 200B, and the cooled air flows out through the air outlet 200BOUT. In addition, the air outlet 320AOUT of the upper core 100A and the air inlet 320BIN of the lower core 100B are made to communicate with each other, so that air is introduced through the air inlet 320AIN to be heated in the inner circumferential refrigerant paths 320A and 320B, and the heated air flows out through the air outlet 320BOUT.

Thus, the cool wind and the hot wind are generated by both of the upper core 100A and the lower core 100B, in the mode 1.

To create the airflow of the mode 1, the controller 600 controls the three-way valves, the clutch, and the pumps according to the flowchart shown in FIG. 9.

The controller 600 turns on the clutch 300C and turns on the pump 550P1 and the pump 550P2, to thereby supply air from outside to the air inlets 200AIN, 200BIN, 320AIN, and 320BIN (S141).

Figure 13:
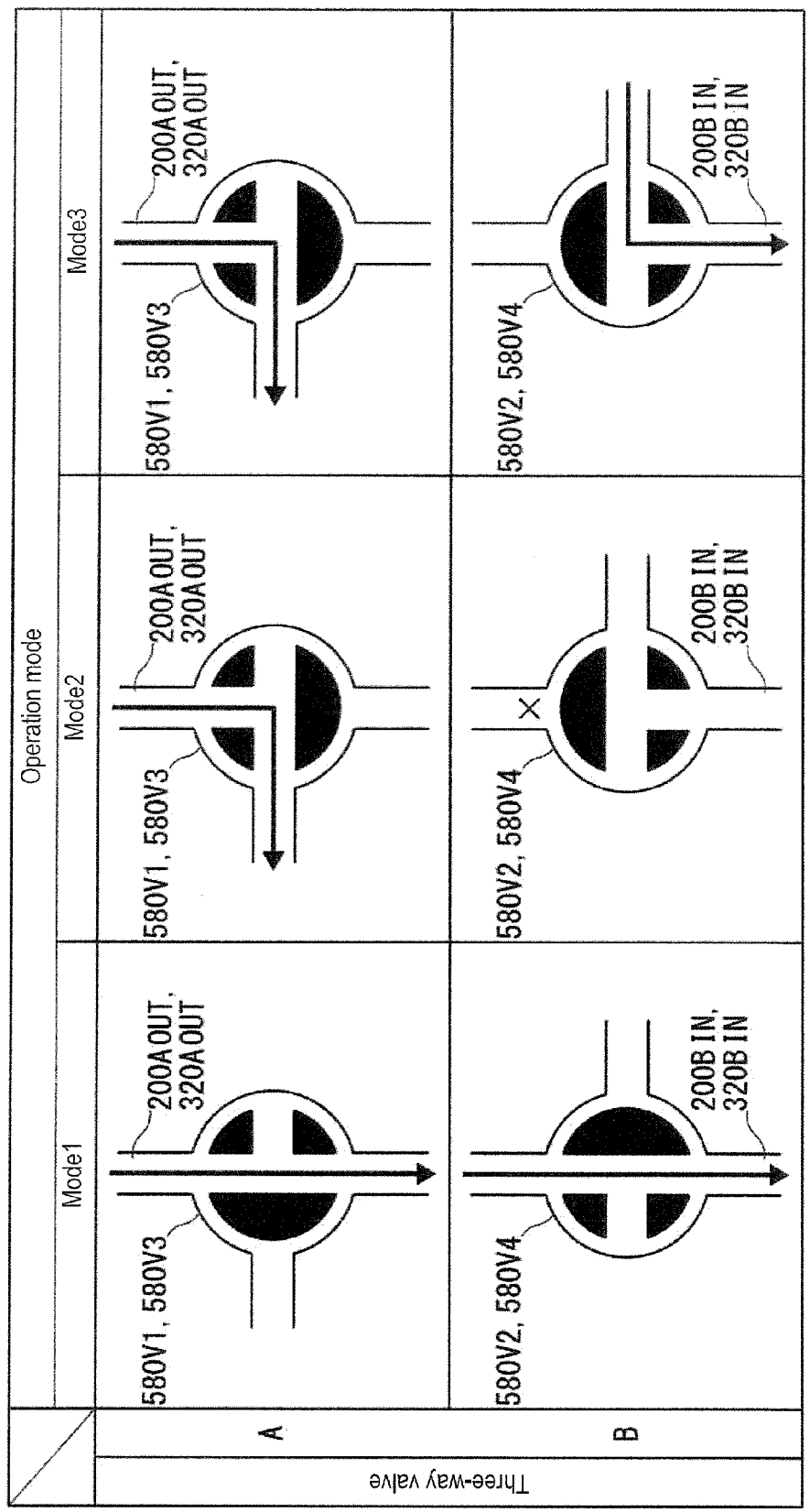
FIG. 13 is a table for explaining operations of three-way valves in each of the operation modes.

The controller 600 drives the three-way valves 580V1, 580V2, 580V3, and 580V4 so as to set those three-way valves to the position shown in the column of the mode 1 in FIG. 13. More specifically, the outer circumferential refrigerant paths 200A and 200B of the upper core 100A and the lower core 100B are connected in series, and the inner circumferential refrigerant paths 320A and 320B of the upper core 100A and the lower core 100B are connected in series (S142).

Figure 10:
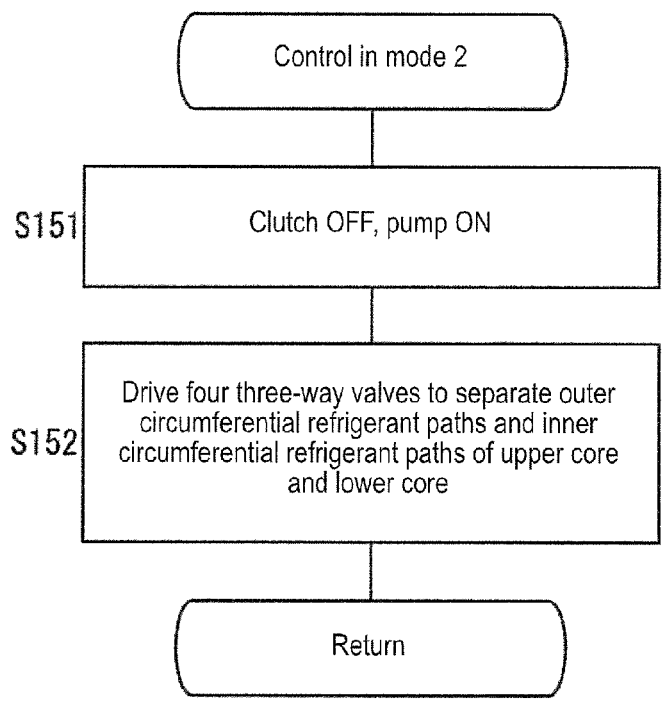
FIG. 10 is an operation flowchart of mode 2 performed by the controller.

FIG. 10 is an operation flowchart of the mode 2 performed by the controller 600. The mode 2 is the operation mode in which the magnetic air conditioner 100 separates the lower core 100B from the upper core 100A so as to allow only the upper core 100A to operate, as shown in the column of the mode 2 in FIG. 14.

The mode 2 is the operation mode in which an airflow shown in the column of the mode 2 in FIG. 14 is created. The air outlet 200AOUT of the upper core 100A and the air inlet 200BIN of the lower core 100B are separated from each other. The air introduced through the air inlet 200AIN is cooled only in the outer circumferential refrigerant path 200A, and the cooled air flows out through the air outlet 200AOUT. Likewise, the air outlet 320AOUT of the upper core 100A and the air inlet 320BIN of the lower core 100B are separated from each other. The air introduced through the air inlet 320AIN is heated only in the inner circumferential refrigerant path 320A, and the heated air flows out through the air outlet 320AOUT.

Thus, the cool wind and the hot wind are generated only by the upper core 100A in the mode 2.

To create the airflow of the mode 2, the controller 600 controls the three-way valves, the clutch, and the pumps according to the flowchart shown in FIG. 10.

The controller 600 turns off the clutch 300C and turns on the pump 550P1 and the pump 550P2, to thereby supply air from outside to the air inlets 200AIN, 200BIN, 320AIN, and 320BIN (S151).

The controller 600 drives the three-way valves 580V1, 580V2, 580V3, and 580V4 so as to set those three-way valves to the position shown in the column of the mode 2 in FIG. 13. More specifically, the outer circumferential refrigerant paths 200A and 200B of the upper core 100A and the lower core 100B are separated from each other, and the inner circumferential refrigerant paths 320A and 320B of the upper core 100A and the lower core 100B are separated each other (S152).

Figure 11:
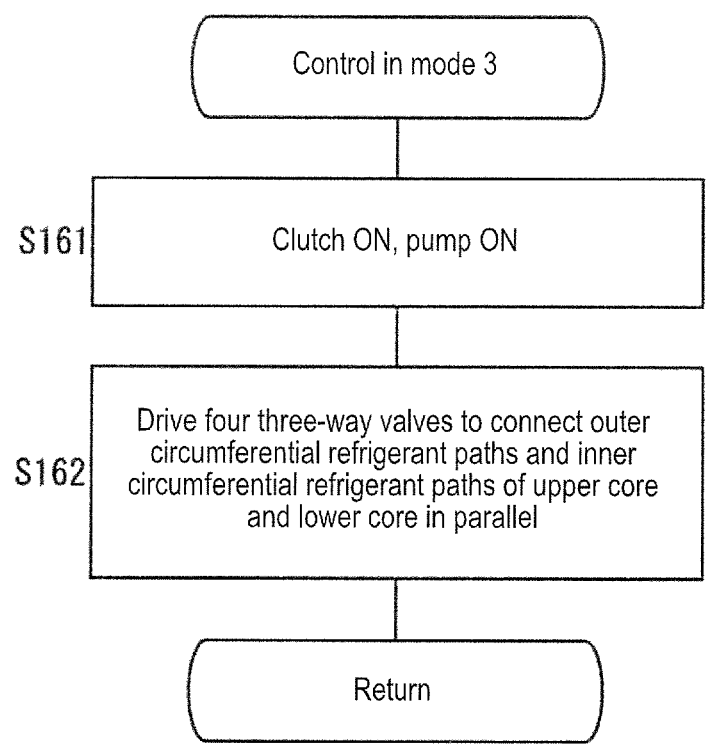
FIG. 11 is an operation flowchart of mode 3 performed by the controller.

FIG. 11 is an operation flowchart of the mode 3 performed by the controller 600. The mode 3 is the operation mode in which the magnetic air conditioner 100 separates the lower core 100B from the upper core 100A, so as to allow the upper core 100A and the lower core 100B to independently operate in parallel, as shown in the column of the mode 3 in FIG. 14.

The mode 3 is the operation mode in which an airflow shown in the column of the mode 3 in FIG. 14 is created. The air outlet 200AOUT of the upper core 100A and the air inlet 200BIN of the lower core 100B are separated from each other. The air introduced through the air inlet 200AIN is cooled only in the outer circumferential refrigerant path 200A, and the cooled air flows out through the air outlet 200AOUT. Likewise, the air outlet 320AOUT of the upper core 100A and the air inlet 320BIN of the lower core 100B are separated from each other. The air introduced through the air inlet 320AIN is heated only in the inner circumferential refrigerant path 320A, and the heated air flows out through the air outlet 320AOUT. Further, the air introduced through the air inlet 200BIN of the lower core 100B is cooled only in the outer circumferential refrigerant path 200B, and the cooled air flows out through the air outlet 200BOUT. Likewise, the air introduced through the air inlet 320BIN of the lower core 100B is heated only in the inner circumferential refrigerant path 320B, and the heated air flows out through the air outlet 320BOUT.

Thus, the upper core 100A generates the cool wind and the hot wind, and also the lower core 100B generates the cool wind and the hot wind, in the mode 3.

To create the airflow of the mode 3, the controller 600 controls the three-way valves, the clutch, and the pumps according to the flowchart shown in FIG. 11.

The controller 600 turns on the clutch 300C and turns on the pump 550P1 and the pump 550P2, to thereby supply air from outside to the air inlets 200AIN, 200BIN, 320AIN, and 320BIN (S161).

The controller 600 drives the three-way valves 580V1, 580V2, 580V3, and 580V4 so as to set those three-way valves to the position shown in the column of the mode 3 in FIG. 13. More specifically, the outer circumferential refrigerant paths 200A and 200B of the upper core 100A and the lower core 100B are separated from each other, and the inner circumferential refrigerant paths 320A and 320B of the upper core 100A and the lower core 100B are separated each other. Accordingly, the air introduced through the air inlet 200AIN of the upper core 100A flows to the air outlet 200AOUT, and the air introduced through the air inlet 320AIN flows to the air outlet 320AOUT. Likewise, the air introduced through the air inlet 200BIN of the lower core 100B flows to the air outlet 200BOUT, and the air introduced through the air inlet 320BIN flows to the air outlet 320BOUT (S162).

Figure 12:
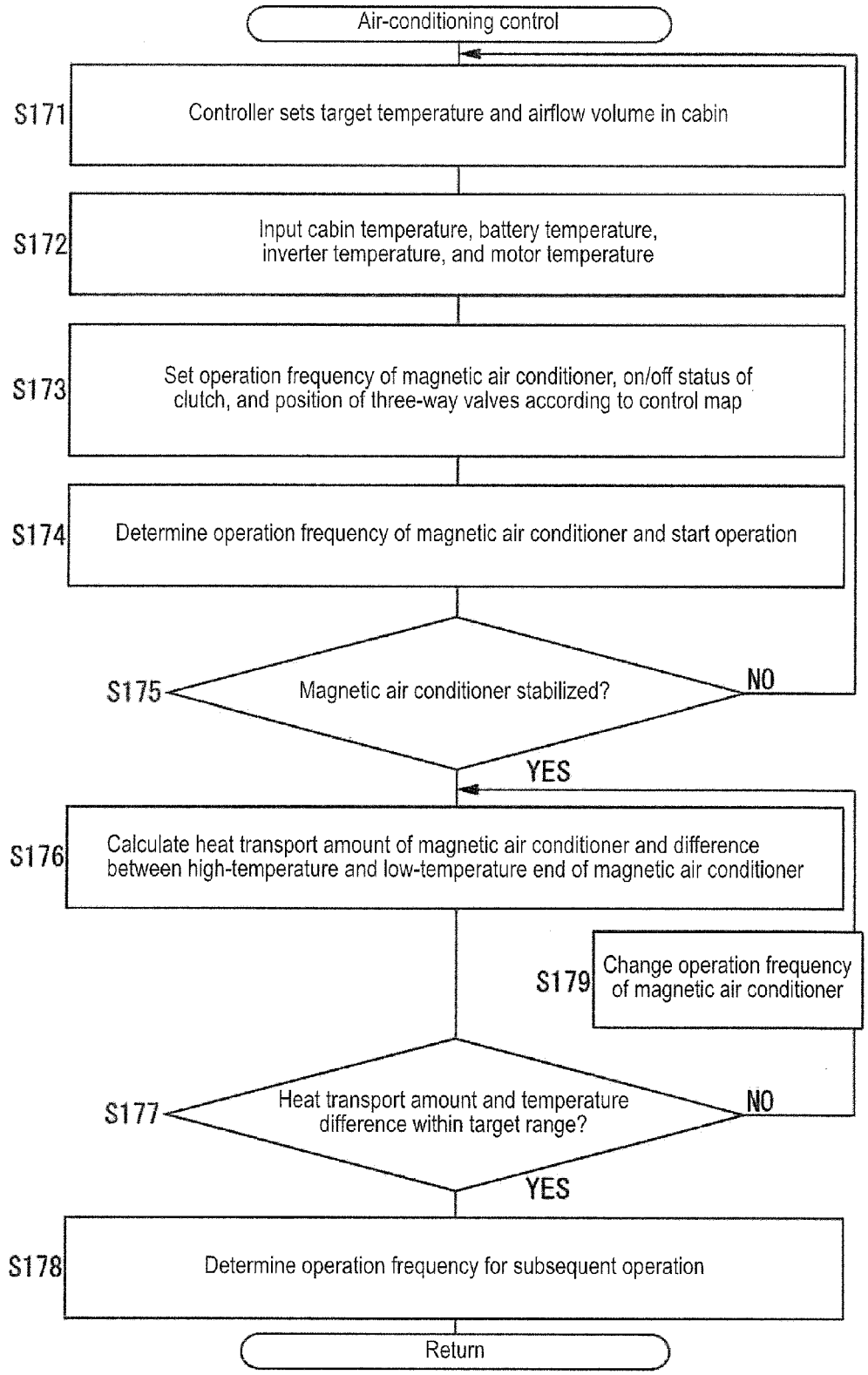
FIG. 12 is an operation flowchart for air conditioning control by the controller.

FIG. 12 is an operation flowchart for air conditioning control by the controller. The flowchart shown in FIG. 12 corresponds to a sub routine of the operation flowchart shown in FIG. 8. The controller 600 performs the air conditioning control as follows.

The controller 600 sets the target temperature and the airflow volume in the cabin (S171). The controller 600 receives the inputs of the temperature in the cabin from the cabin temperature sensor 620 (see FIG. 7), the temperature of the battery 720 (see FIG. 7) from the battery temperature sensor 660, the temperature of the inverter 730 from the inverter temperature sensor 670, and the temperature of the motor 740 from the motor temperature sensor 650 (S172).

The controller 600 controls the operation frequency of the magnetic air conditioner 100 (rotating speed of the outer-rotor motor 300M), the on/off status of the clutch 300C, and the position of the three-way valves 580V1 to 580V4, on the basis of a control map stored in the controller 600 (S173). The controller 600 starts the operation upon determining the operation frequency of the magnetic air conditioner 100 (rotating speed of the outer-rotor motor 300M) (S174).

Then the controller 600 decides whether the magnetic air conditioner 100 has entered a stable state. To be more detailed, the controller 600 decides whether the magnetic air conditioner 100 has been working for a predetermined period of time or by a predetermined number of rotations (S175). Before the magnetic air conditioner 100 is stabilized (NO at S175), the steps S171 to S175 are repeated.

When the magnetic air conditioner 100 is decided to have entered the stable state (YES at S175), the controller 600 calculates the amount of heat transported by the magnetic air conditioner 100, and a difference between a high-temperature end and a low-temperature end of the magnetic air conditioner 100 (S176). The controller 600 then decides whether the heat transport amount of the magnetic air conditioner 100 and the difference between the high-temperature end and the low-temperature end of the magnetic air conditioner 100 calculated at S176 are within a target range (S177).

In the caser where the heat transport amount of the magnetic air conditioner 100 and the difference between the high-temperature end and the low-temperature end of the magnetic air conditioner 100 calculated at S176 are within the target range (YES at S177), the controller 600 determines the operation frequency (rotating speed of the outer-rotor motor 300M) to be set for the subsequent operation (S178). In contrast, in the case where the heat transport amount of the magnetic air conditioner 100 and the difference between the high-temperature end and the low-temperature end of the magnetic air conditioner 100 calculated at S176 are not within the target range (NO at S177), the controller 600 changes the operation frequency of the magnetic air conditioner 100 (rotating speed of the outer-rotor motor 300M), and returns to the step S176 (S179).

As described thus far, the magnetic air conditioner according to this embodiment is capable of efficiently generating cool wind and hot wind, according to the required cooling performance.

The magnetic air conditioner according to this embodiment is configured to transmit and disconnect the driving force of the outer-rotor motor 300M to and from the lower core 100B via the clutch 300C, so as to generate cool wind and hot wind according to the required air conditioning performance. Therefore, energy-saving operation can be performed.

The magnetic air conditioner according to this embodiment is configured to connect and separate the lower core 100B via the clutch 300C, and therefore the rotational force can be transmitted with a simple structure and control.

In the magnetic air conditioner according to this embodiment, the communication valves are operable either in the mode of allowing communication between the refrigerant paths on the inner circumferential side and between the refrigerant paths on the outer circumferential side of all the groups, or in the mode of allowing communication between the refrigerant paths on the inner circumferential side and between the refrigerant paths on the outer circumferential side of a part of the groups. Therefore, unnecessary flow of the refrigerant can be minimized, and resultantly the refrigerant driving energy can be reduced. Further, allowing the refrigerant paths on the inner circumferential side and the outer circumferential side to communicate with each other enables sufficient heat exchange to be performed compared with the case where the refrigerant paths are not connected, and therefore a sufficiently cooled refrigerant flow and a sufficiently heated refrigerant flow can be created.

The magnetic air conditioner according to this embodiment is configured to allow communication between the refrigerant paths on the inner circumferential side and between the refrigerant paths on the outer circumferential side of all the groups either in series or in parallel, which enables the refrigerant on the inner circumferential side and the outer circumferential side of all the groups to exchange the heat.

The magnetic air conditioner according to this embodiment controls the communication valves in linkage with the clutch, and thus quickly performs the operation in each mode.

The magnetic air conditioner according to this embodiment employs the three-way valve as the communication valve, and therefore the refrigerant flow can be adjusted through a simple control.

In the magnetic air conditioner according to this embodiment, different temperature ranges for exhibiting the magneto-caloric effect are set for the plurality of groups of the magneto-caloric materials. Such a setting allows the temperature of the incoming refrigerant and the temperature of the outgoing refrigerant to be different, and also allows an increase of the difference in temperature between the incoming refrigerant and the outgoing refrigerant, and therefore the refrigerant can be supplied to a plurality of air-conditioning targets each requiring a different temperature level.

The magnetic air conditioner according to this embodiment employs ambient air as the refrigerant, and therefore heat can be transported without the need to use a specific refrigerant such as water.

The magnetic air conditioner according to this embodiment has a simple structure and is operable through a simple control, and can therefore be utilized for air conditioning of various devices in a vehicle.

The invention claimed is:

1. A magnetic air conditioner including a plurality of heat generation disks of a hollow shape each having a magneto-caloric material and a thermal switch, and a plurality of magnetic field application disks of a hollow shape each having a magnetic field application unit that applies a magnetic field to the magneto-caloric material, the heat generation disks and the magnetic field application disks being alternately stacked, in which at least either of the heat generation disks and the magnetic field application disks are made to relatively rotate so as to transport heat in a direction intersecting the rotating direction, the magnetic air conditioner comprising:
   a driver that causes at least one of the heat generation disks and the magnetic field application disks to rotate; and
   a transmission device that transmits a driving force from the driver collectively to the plurality of heat generation disks or to the plurality of magnetic field application disks, or separately to one of a plurality of groups of the heat generation disks or the magnetic field application disks.

2. The magnetic air conditioner according to claim 1, wherein the transmission device includes a clutch that unifies the plurality of heat generation disks or the plurality of magnetic field application disks and separates the heat generation disks or the magnetic field application disks into a plurality of groups.

3. The magnetic air conditioner according to claim 1, further comprising:
   refrigerant paths provided in each of the plurality of groups along an outer circumferential portion and an inner circumferential portion of the plurality of heat generation disks or the plurality of magnetic field application disks; and
   a communication valve that individually allows communication between the refrigerant paths on an inner circumferential side and communication between the refrigerant paths on an outer circumferential side in each of the groups,
   wherein the communication valve is operable either in a mode of allowing communication between the refrigerant paths on the inner circumferential side and between the refrigerant paths on the outer circumferential side of all the groups, or in a mode of allowing communication between the refrigerant paths on the inner circumferential side and between the refrigerant paths on the outer circumferential side of a part of the groups.

4. The magnetic air conditioner according to claim 3,
   wherein the communication valve allows communication between the refrigerant paths on the inner circumferential side and between the refrigerant paths on the outer circumferential side of all the groups either in series or in parallel, in the case of allowing communication between the refrigerant paths on the inner circumferential side and between the refrigerant paths on the outer circumferential side of all the groups.

5. The magnetic air conditioner according to claim 3, wherein the communication valve is operated in linkage with the operation of the clutch.

6. The magnetic air conditioner according to claim 3, wherein the communication valve is a three-way valve.

7. The magnetic air conditioner according to claim 1, wherein different temperature ranges for exhibiting a magneto-caloric effect are set for the respective groups of the magneto-caloric materials.

8. The magnetic air conditioner according to claim 1, wherein the inner circumferential refrigerant path and the outer circumferential refrigerant path are configured to receive air.

9. The magnetic air conditioner according to claim 1, configured to generate cool air and hot air for air conditioning of a cabin of a vehicle or temperature adjustment of a battery, an inverter, and a motor installed in the vehicle.

* * * * *